US006633032B2

(12) United States Patent
Houge et al.

(10) Patent No.: US 6,633,032 B2
(45) Date of Patent: Oct. 14, 2003

(54) MASS SPECTROMETER PARTICLE COUNTER

(75) Inventors: Erik Cho Houge, Orlando, FL (US); John Martin McIntosh, Orlando, FL (US); Fred Anthony Stevie, Orlando, FL (US); Steven Barry Valle, Orlando, FL (US); Catherine Vartuli, Orlando, FL (US)

(73) Assignee: Agere Systems Inc., Allentown, PA (US)

( * ) Notice: Subject to any disclaimer, the term of this patent is extended or adjusted under 35 U.S.C. 154(b) by 127 days.

(21) Appl. No.: 09/727,014

(22) Filed: Nov. 30, 2000

(65) Prior Publication Data

US 2002/0063201 A1 May 30, 2002

(51) Int. Cl.[7] .................................... B01D 59/44

(52) U.S. Cl. .................................... 250/288

(58) Field of Search .................... 250/423 A, 288, 250/492.2, 298, 309, 576; 432/124; 356/335–343; 73/28.01, 28.04–28.06, 31.01, 863.21, 863.23

(56) References Cited

U.S. PATENT DOCUMENTS

| | | | | |
|---|---|---|---|---|
| 4,819,477 A | * 4/1989 | Fisher et al. | ........ | 73/23 |
| 5,382,794 A | * 1/1995 | Downey et al. | ........ | 250/288 |
| 5,693,895 A | * 12/1997 | Baxter | ........ | 73/863.22 |
| 5,825,487 A | * 10/1998 | Felbinger et al. | ........ | 356/338 |

* cited by examiner

*Primary Examiner*—John R. Lee
*Assistant Examiner*—Phillip A Johnston
(74) *Attorney, Agent, or Firm*—Ferdinand M. Romano

(57) ABSTRACT

The present invention relates to a device for testing particles for composition and concentration. The device includes a particle counter, a collector screen, and a mass spectrometer. In one embodiment, the collector screen is positioned to receive particles received by the particle counter, and the mass spectrometer is positioned to receive counted particles retained on the collector screen.

21 Claims, 3 Drawing Sheets

MASS SPECTROMETER PARTICLE COUNTER

FIELD OF THE INVENTION

The invention relates to an integrated particle counter-mass spectrometer system, and, more particularly, to a mechanism for collecting particles from a particle counter and delivering the collected particles to a mass spectrometer.

BACKGROUND OF THE INVENTION

Microcontamination is an ongoing problem in a modern semiconductor facility. Line widths are approaching 0.16 microns in diameter, and commercially fatal defects are quickly approaching 0.05 microns in diameter. Advancements in semiconductor manufacture serve to exacerbate the contamination problems.

Commercially fatal defects are produced by human exfoliation of particles, moving parts in machines, and even the robots used to move wafers from cassettes to tools. Thus, a clean room is under a constant barrage of defect producing commercially fatal sized particles.

Microcontamination engineers battle this problem with condensation and particle counters. This enables them to monitor the quantity of particles per volume of air and also the distribution of the size of the particles. However, these techniques fall short of meeting the challenge offered by the progressively decreasing size of semiconductor line widths.

Laser particle counters work by moving a volume of air through a laser field. The particles scatter the laser beams causing a scattering event that can be monitored and yield a measurement of the particle's size.

Mass spectrometers use an inlet, an ion source, a mass analyzer, an ion detector, a data output from the ion detector, and a data system. The data system processes the output into a chart of abundance versus mass.

Mass spectrometry is a generalized technique whereby a mass per charge can be separated through a dynamic range. Mass spectrometry is a powerful technique that is able to analyze gases (electron impact mass spectrometry), liquids (inductively coupled plasma mass spectrometry and gas chromatography), solids (glow discharge mass spectrometry and secondary ion mass spectrometry). It is used to determine the structural identity of complex compounds, separate out phases of materials in the gaseous form, analyze the elemental composition of material, depth profile elemental concentration of one atomic species in a substrate and multiple other uses throughout the scientific disciplines. Essentially all mass spectrometers have the same basic components. A sample is introduced into the mass spectrometer and is ionized by some energy source. The ions travel though a mass analyzer where the ions are sorted and separated from one and other. Finally a detector of some sort is used to quantify the relative intensities of the different ion species.

One form of mass spectrometry is known as secondary ion mass spectrometry (SIMS). SIMS is a process whereby a primary ion beam is used to expel secondary ion from a sample su ace through the means of a collision cascade. The ejected ions are then separated by mass to analytically characterize the properties of a surface region of a solid. SIMS is mainly used today to analyze small quantities of elements in impurity analysis. By focusing the primary ion beam through a series of electromagnetic lenses and then rastering it in a specific pattern, the primary ion beam will begin to sputter away the sample surface. This is know as dynamic SIMS. Through a monitoring of the expelled secondary ions, a depth profile of composition and concentration versus depth can be produced. The resultant profile can be made to quantify the distribution of elements at and below a sample surface.

SIMS uses an ion probe and also detects an ion species. Similar to RBS (Rutherford Backscattering Spectroscopy), SIMS has an ability to analyze all of the elements of the periodic table. By way of contrast, EDX (Energy Dispersive X-ray Spectroscopy), XPS (X-ray Photoelectron Spectroscopy), and AES (Auger Electron Spectroscopy) have limited abilities in conjunction with lighter elements. The biggest advantage over similar surface analysis techniques comes from SIMS detection lower limit and vast dynamic range. SIMS can measure all elements down to the part per million range and some down to detection limits of a part per billion. This is considerably beyond the detection limits of AES, XPS, EDX, which is in the range of 0.1 to 1 ppm, and RPS which is around 100 ppm.

The most common prima ion beams for SIMS are $O_2^+$ for electropositive elements and $Cs^+$ for electronegative elements. Other primary beam ions are used for specific types of applications but cesium and oxygen ions are the two most commonly used. A primary ion beam is directed to impact a sample surface, causing a scattering of material belonging both to the sample surface and the primary ion beam. The secondary ions emitted from the sample can carry a wide variety of energy from a few eV to energies approaching the incident beam energy. As the primary beam impacts the sample surface, a transfer of energy occurs between the incident primary ion and the atoms on the surface of the ample. The collision cascade is the closest model to describe the movements of the primary ion beam as it interacts with the atoms of the sample. The collision cascade describes the transfer of energy from the incident ions to target atoms that then continue to transfer the energy through collisions to other surrounding atoms until the energy is equilibrated with the sample surface. The primary ions can penetrate to a depth Rp, the penetration depth below the sample surface. Collisions that occur near or at the surface that eject ion into the vacuum of the system, result in the formation of what is called secondary ion and it is these that are analyzed by the mass spectrometer. The effect of this sputtering can lead to surface morphology roughness due to lattice plane locations. The effect can be minimized by rotation of the sample during sputtering.

SUMMARY OF THE INVENTION

The present invention relates to a device for testing particles for composition and concentration. The device includes a particle counter, a collector screen, and a mass spectrometer. In one embodiment, the collector screen is positioned to receive particles received by the particle counter, and the mass spectrometer is positioned to receive counted particles retained on the collector screen.

DETAILED DESCRIPTION OF THE PREFERRED EMBODIMENTS OF THE INVENTION

The present invention integrates a laser particle counter, a particle collecting mechanism and a mass spectrometer into an coordinated unit. The description is now directed to exemplary embodiments shown in the figures.

A particle counter can employ a laser source for directing a laser beam at particles within said particle counter. A particle collector screen receives and retains counted particles from the particle counter. A transfer member transfers the screen from its position of interaction with the particle counter to its position of interaction with the mass spectrometer.

A transfer member is operational to move the collector screen from a first position to at least a second position. In the first position the collector screen is oriented to receive particles from the particle counter and, in the second position, it is oriented to be within a vacuum field of the mass spectrometer. The collector screen can be a microperforated member, having microperforation of a diameter less than the diameter of particles counted in the particle counter. The collector screen can be biased to attract specific particles and also can be a film member.

A method of operation of the system for counting and analyzing particles includes delivering a volume of air to a particle counter. Counted particles are delivered to the collector screen, which receives and retains the counted particles from said particle counter. The counted particles are transferred from said collector screen to the mass spectrometer. A transferring step includes moving the collector screen from a first position to at least a second position. In the first position the collector screen is oriented to receive particles from the particle counter and, in the second position, the collector screen is oriented to be within a vacuum field of the mass spectrometer. The next steps are analyzing particles from the collector screen in the mass spectrometer and outputting data from the mass spectrometer to a data system. The data system determines particle composition and concentration.

Figure 1:
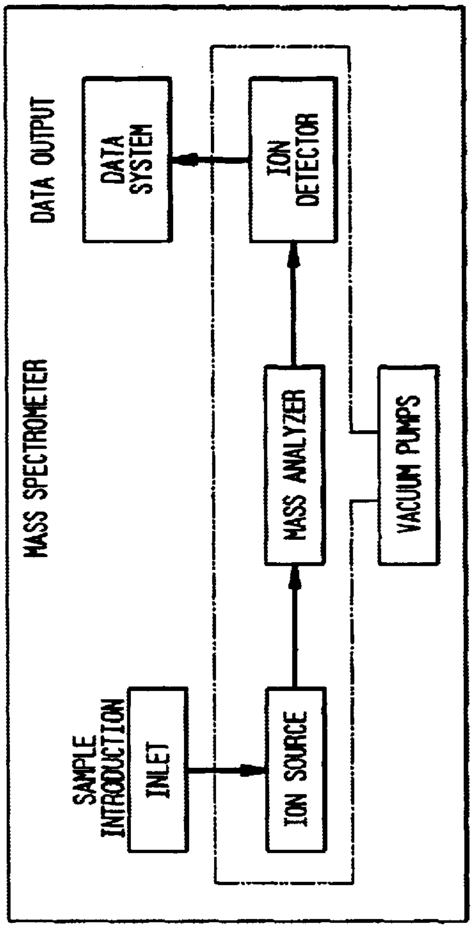
FIG. 1 (PRIOR ART)
FIG. 1 is a schematic illustration of a typical, prior art mass spectrometer.
Figure 2:
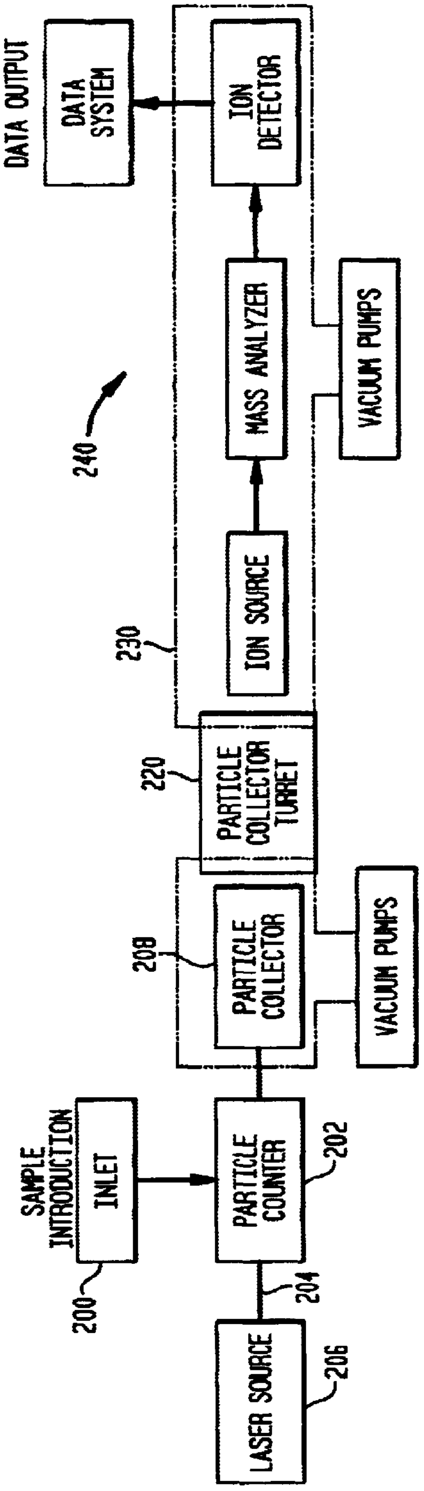
FIG. 2 is a schematic illustration of an integrated particle counter and mass spectrometer, in accordance with the present invention.

Looking now to the drawings, a typical mass spectrometer system of the prior art is illustrated in FIG. 1. FIG. 2 illustrates a source of a volume of air introduced to the inlet 200 of the particle counter 202. The particle counter can be as disclosed in U.S. Pat. Nos. 5,467,189, 5,515,164, 5,600,438, or 5,825,487. A laser beam 204 from the laser source 206 creates the scattering event within the particle counter 202. The particles are then collected on a particle collector screen 208.

The particle collector screen 208 can be a mesh screen, a collector grid, a HEPA type of filter media or a film. The grid can be a microperforated copper sheet having holes smaller than the diameter of the particles to be collected. Twenty micron-diameter holes can be used in the grid. The collector structure can be of the type employed in mass spectrometers, as is well known in the art.

The collecting mechanism of the present invention, as illustrated in FIG. 2, can employ a motorized turret 220 to introduce the collected particle sample to a vacuum chamber 230 of the mass spectrometer indicated generally as 240. Other mechanisms can be advantageously employed for selectively interacting the collecting mechanism with the particle counter or the mass spectrometer.

Figure 3:
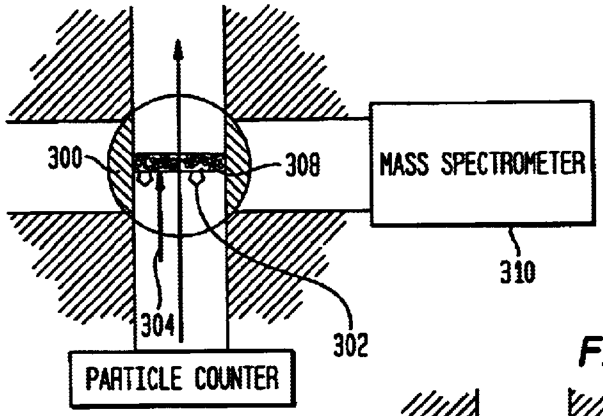
FIG. 3 is schematic illustration of a turret operated particle collector between a particle counter and a mass spectrometer.
Figure 4:
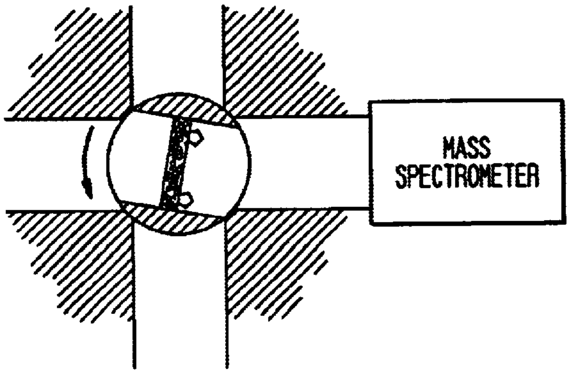
FIG. 4 is a schematic representation of the device of FIG. 3, showing the collector screen beginning to rotate.
Figure 5:
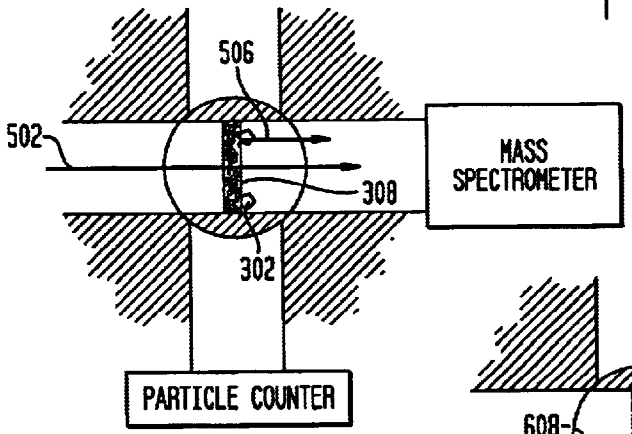
FIG. 5 is a schematic representation of the device of FIG. 3, showing the collector screen rotated to face the mass spectrometer inlet.

As illustrated in FIG. 3, particles 302 are driven from the particle counter 301 in the direction of arrow 304, toward the collector screen 308. The turret system 300 is rotated as indicated by arrow 402 of FIG. 4, to bring the collected particle samples 302 on the screen 308, into a position facing the mass spectrometer inlet 500. With reference to FIG. 5, a vacuum pump produces a driving force in the direction of arrow 502, thus driving the particles 302 in the direction of arrow 506 such that they can be analyzed by the mass spectrometer 310.

Figure 6:
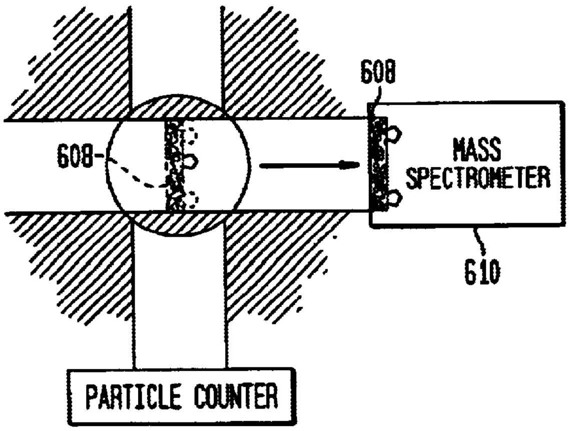
FIG. 6 is a schematic representation of the device of FIG. 3, showing the collector screen rotated toward the mass spectrometer and moved to a position in the mass spectrometer inlet.

As illustrated in the alternate embodiment of FIG. 6, the screen 608 can be mounted to be moved by a motorized system, not shown, from its initial rotated position represented by a dotted line representation of screen 608, to a position within the mass spectrometer 610, as represented by 608*a*. The direction of movement of the screen 608 is illustrated by arrow 602.

Figure 7:
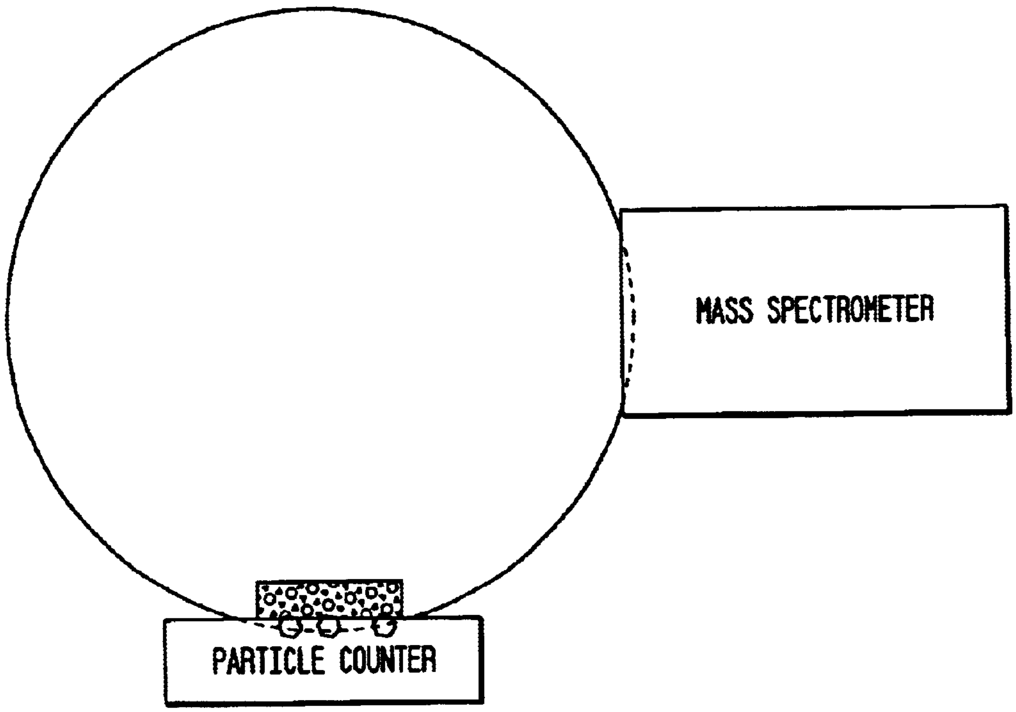
FIG. 7 is schematic illustration of an alternate embodiment of a turret operated with the particle collector rotationally moveable between a particle counter and a mass spectrometer.
Figure 8:
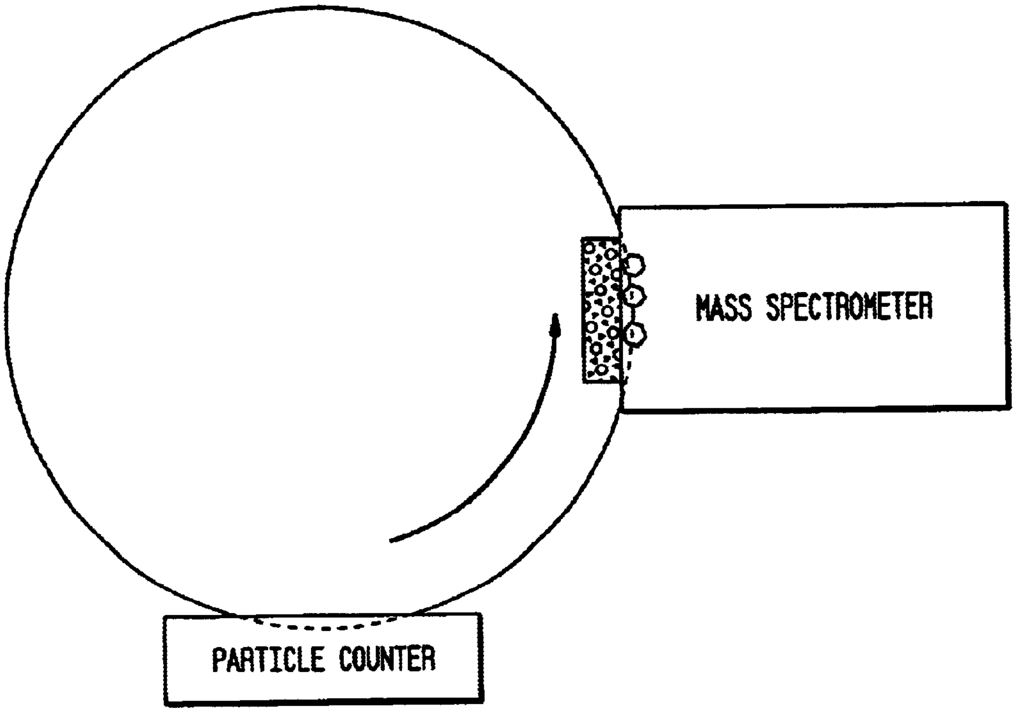
FIG. 8 is a schematic representation of the device of FIG. 7, showing the collector screen rotated to a position in the mass spectrometer inlet.

FIG. 7 illustrates a further embodiment of a turret mechanism indicated generally as 700, in which the collector screen 708 is positioned proximate the peripheral edge of the turret platform 720. The collector screen upon rotation, as indicated by arrow 802, is positioned at the inlet of the mass spectrometer 710, and is subjected to the vacuum within the mass spectrometer 710. The particles 714 are thus transferred from the region of the particle counter 702 to the mass spectrometer 710. The operation of the mass spectrometer is in accordance with standard procedures, as is well known in the art.

A data analysis system for determining particle size and composition is well known in the art and uses conventional technology to process the data generated by the particle counter and the mass spectrometer.

The foregoing description, although described in preferred embodiments with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the claims are to be encompassed as further embodiments of the present invention.

What is claimed is:

1. A device for testing particles for composition and concentration, comprising:

a particle counter, a collector screen, said collector screen being positioned for retaining particles received by said particle counter, and a mass spectrometer positioned to receive counted particles retained on said collector screen.

2. A device for testing particles for composition and concentration, comprising:

a particle counter, a collector screen positioned to receive particles from said particle counter and transfer retained counted particles to a mass spectrometer, and a mass spectrometer positioned to receive counted particles retained on said collector screen.

3. The device of claim 2, further comprising a transfer member, operational to move said collector screen from a first position to at least a second position, in said first position said collector screen being oriented to receive particles from said particle counter and in said second position, said collector screen being oriented to be within a partial vacuum of said mass spectrometer.

4. The device of claim 1, wherein said collector screen is a microperforated member, having microperforation of a diameter less than the diameter of particles counted in said particle counter.

5. The device of claim 1, wherein said collector screen is biased to attract predetermined particles.

6. The device of claim 1, wherein said collector screen is a film member.

7. The device of claim 1, wherein said collector screen is a microporous grid member.

8. A method for counting and analyzing particles, comprising the steps of:

delivering a volume of air to a particle counter, said volume of air containing particles to be counted and analyzed, delivering counted particles to a collector screen, and transferring counted particles from said collector screen to a mass spectrometer.

9. The method of claim 8, wherein the transferring step includes moving said collector screen from a first position to at least a second position, in said first position said collector screen being oriented to receive particles from said particle counter and in said second position, said collector screen being oriented to be within a vacuum field of said mass spectrometer, said method further including analyzing particles from said collector screen in said mass spectrometer.

10. The method of claim 8, further comprising the step of outputting data from said mass spectrometer to a data system.

11. The method of claim 10, wherein said data system determines particle composition and concentration.

12. The method of claim 8, further comprising the step of biasing said collector screen to attract predetermined particles.

13. A device for testing particles for composition and concentration, comprising:

a particle counter having a laser source for directing a laser beam at particles within said particle counter, a collector screen positioned to receive particles from said particle counter, a transfer member, and a mass spectrometer, said transfer member being operational to move said collector screen from a first position oriented to receive particles from said particle counter, to a second position oriented to be within a vacuum field of said mass spectrometer.

14. The device of claim 13, wherein said collector screen is a microperforated member, having microperforations of a diameter less than the diameter of particles counted in said particle counter.

15. The device of claim 13, wherein said collector screen is biased to attract particles.

16. The device of claim 13, wherein said collector screen is a film member.

17. The device of claim 13, wherein said collector screen is a microporous grid member.

18. The device of claim 1 wherein the particle counter is a light scattering particle counter.

19. The device of claim 2 wherein the particle counter is a light scattering particle counter.

20. The method of claim 8 wherein the particle counter is a light scattering particle counter.

21. The device of claim 13 herein the particle counter is a light scattering particle counter.

* * * * *